July 14, 1925.
C. F. GILCHRIST
BATTERY CONTAINER
Filed Aug. 4, 1919
1,545,753
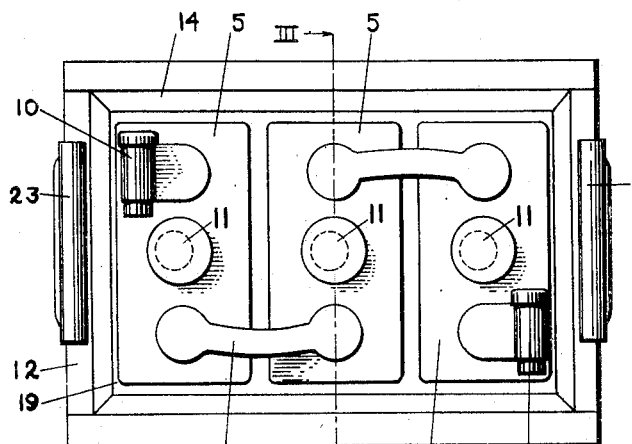
Fig. I.
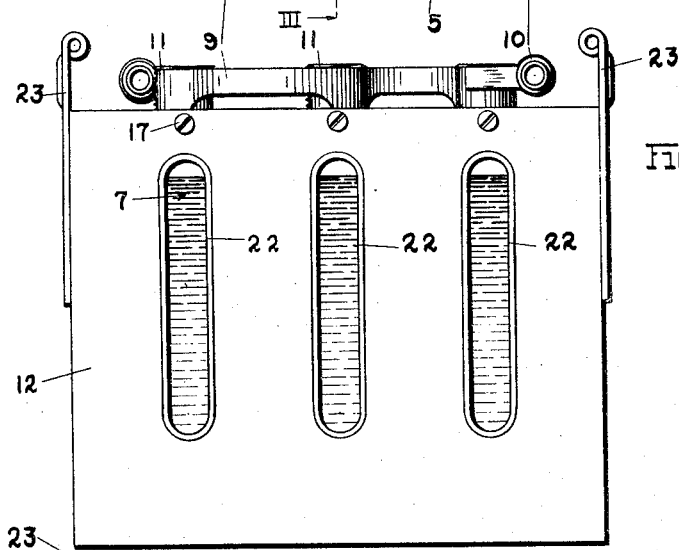
Fig. II.
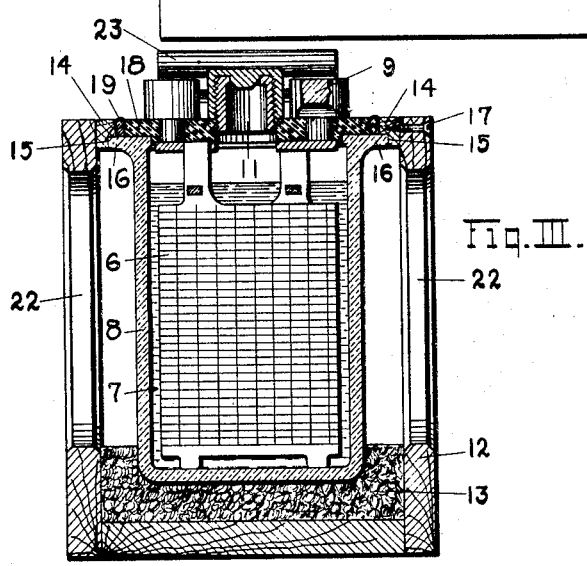
Fig. III.
INVENTOR.
Clarence F. Gilchrist.
BY Chester W. Braselton
ATTORNEY Patented July 14, 1925.

1,545,753

UNITED STATES PATENT OFFICE.

CLARENCE F. GILCHRIST, OF TOLEDO, OHIO, ASSIGNOR, BY MESNE ASSIGNMENTS, TO THE ELECTRIC AUTO-LITE COMPANY, OF TOLEDO, OHIO, A CORPORATION OF OHIO.

BATTERY CONTAINER.

Application filed August 4, 1919. Serial No. 315,071.

*To all whom it may concern:*

Be it known that I, CLARENCE F. GILCHRIST, a citizen of the United States, residing at Toledo, in the county of Lucas and State of Ohio, have invented certain new and useful Improvements in Battery Containers, of which I declare the following to be a full, clear, and exact description.

This invention relates to electric batteries, particularly to batteries having an electrolyte where it is desirable to be able to observe the height of the electrolyte, the condition of the elements, the amount of sediment, etc.

Where such batteries have been subjected to severe vibration and sudden shocks, as for example on automobiles, it has been customary to employ a hard rubber jar or container for the active elements and to enclose one or more cells constituting the battery in a wooden box for protection and convenience of handling, the cells being sealed in the box with a suitable insulating compound. As so constructed, there is no opportunity for observing the level of the electrolyte which invariably lowers due to evaporation and other causes, or for observing the condition of the battery plates, amount of sediment, etc.

An object of my invention is to provide a construction whereby the cells constituting the battery may be safely and securely housed, yet to provide means whereby the electrolyte, the condition of the positive and negative elements and the amount of sediment of each cell may be readily observed without removing the cells or in any way disturbing the battery.

Further objects of this invention relate to economies of manufacture and details of construction as will hereinafter appear from the detailed description to follow. I accomplish the objects of my invention in one instance by the devices and means described in the following specification, but it is evident that the same may be varied widely without departing from the scope of the invention as pointed out in the appended claims. A structure constituting one embodiment of my invention, which may be the preferred, is illustrated in the accompanying drawings forming a part hereof, in which:

Figure I is a top plan view of a battery and container, according to my invention.

Fig. II is a side elevation of the same.

Fig. III is a cross sectional view taken on the line III—III of Fig. I.

In the drawings, similar reference numerals refer to similar parts throughout the several views, and the sectional views are taken looking in the direction of the arrows at the ends of the section lines.

As the construction of the battery cells themselves is that in common and every day use and as such forms no part of the present invention, suffice it to say that in this instance the commonly employed hard rubber jar or receptacle is replaced by a transparent glass receptacle, a detailed description of the cell structure is regarded as superfluous and will be omitted, the description being confined rather to the features of novelty comprising the invention.

In the drawing there is shown a storage battery of three cells 5 of standard construction each having positive and negative plates 6, immersed in an electrolyte 7, contained in a transparent glass jar or receptacle 8. These three cells are connected in series by links 9 and have terminal lugs 10 of the usual form. They are also shown provided with a vent 11. The three cells 5 are shown arranged side by side, and enclosed by a box 12 which may be constructed of wood or any other suitable material. In the bottom of the box there is provided a cushioning seat 13 for the cells of resilient material, as for example felt, which not only supports each cell but also serves to hold the bottom portions of the cells in proper position. Extending around the box at its mouth is a wooden strip 14, having a notch 15 to receive flange 16 of the jar 7. This strip 14 may be secured to the box by wood screws 17 or in any other suitable manner. The hard rubber plates 18 through which extend the battery terminals and the vents rest upon the tops of the jars 7 and between them and the strip 14 suitable sealing compound 19 is poured in to form a seal with the glass jar.

In order that the level of the electrolyte, the condition of the plates or amount of sediment may be observed without removing the cells from the box, there are provided three pairs of openings or windows 22 arranged in opposite sides of the box so that the windows forming a pair are located approximately opposite the central portion of a cell. If it is found desirable for the purpose of greater protection to the glass jars or to prevent the entrance of dust and dirt, these windows may be provided with a glass covering. In setting up the cells in the box the strips 14 are secured in place so as to hold the jars firmly down against the felt 13 whereby no ordinary amount of jarring or vibrating will cause the jars to become disengaged with the strip 14. It will be seen that the strips 14 also space the jars from the sides of the box. The box 12 is shown provided with handles or bales 23 of the usual and well known construction.

While I have described my invention in more or less detail, and as being embodied in certain precise forms I do not desire or intend to be limited thereto, as on the contrary my invention contemplates broadly all proper changes, as well as the omission of immaterial elements and the substitution of equivalents therefor, as circumstances may suggest or necessity render expedient.

Having thus described my invention, what I claim as new and desire to secure by Letters Patent, is:

1. The combination with an electric battery including a transparent jar containing an electrolyte and positive and negative elements, of an enclosing opaque casing for said battery having openings in two opposite sides thereof to permit the entrance of light into said battery and to render the active elements thereof visible.

2. In a device of the class described, the combination with an electric battery including a glass receptacle containing the active elements of the battery, of a casing for said receptacle, resilient means in the lower portion of said casing for supporting said receptacle and for positioning the lower part of the same, and means for positioning the upper part of said receptacle in said casing, said casing having openings or windows in opposite sides thereof to thereby admit light and render visible the contents of said receptacle.

3. The combination with an electric battery comprising a plurality of cells having glass receptacles, of a casing for enclosing and supporting said cells having in two opposite sides thereof a plurality of elongated openings or windows arranged opposite the said cells, certain of said openings serving to admit light to and others permitting the observation of the interior portions of the cells.

4. In a device of the class described, the combination of a transparent receptacle, an opaque casing for holding said receptacle, resilient means in the lower portion of said casing for supporting the receptacle, said casing having openings in opposite walls thereof whereby light may be transmitted through said casing.

5. A casing for an electric battery comprising an opaque compartment, having apertures formed on opposite walls thereof, whereby light may be transmitted through the casing.

In testimony whereof, I affix my signature.

CLARENCE F. GILCHRIST.